(12) United States Patent
Hung

(10) Patent No.: US 8,739,365 B2
(45) Date of Patent: Jun. 3, 2014

(54) HINGE STRUCTURE

(75) Inventor: Hao-Ting Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/584,747

(22) Filed: Aug. 13, 2012

(65) Prior Publication Data

US 2013/0152341 A1 Jun. 20, 2013

(30) Foreign Application Priority Data

Dec. 15, 2011 (CN) .......................... 2011 1 0420298

(51) Int. Cl.
*E05D 11/10* (2006.01)
*G06F 1/16* (2006.01)

(52) U.S. Cl.
CPC .................................... *G06F 1/1681* (2013.01)
USPC .............................................. 16/271; 16/382

(58) Field of Classification Search
CPC .............................. G06F 1/1616; G06F 1/1681
USPC ........... 16/382, 319, 343, 254, 270, 271, 272, 16/387, 388, 389, 390, 391, 392
See application file for complete search history.

(56) References Cited

U.S. PATENT DOCUMENTS

| | | | |
|---|---|---|---|
| 4,716,622 A * | 1/1988 | DeBruyn ........................ | 16/297 |
| 4,720,896 A * | 1/1988 | Lautenschlager et al. ...... | 16/382 |
| 6,389,643 B1 * | 5/2002 | Lim et al. ........................ | 16/271 |
| 2009/0282649 A1 * | 11/2009 | Chen ............................... | 16/347 |
| 2011/0131760 A1 * | 6/2011 | Shen ............................... | 16/346 |

* cited by examiner

*Primary Examiner* — Jeffrey O Brien
(74) *Attorney, Agent, or Firm* — Novak Druce Connolly Bove + Quigg LLP

(57) ABSTRACT

A hinge structure includes a first connecting member, a tray for securing a first component, and a second connecting member for securing a second component. The first connecting member includes two clamping panels substantially parallel to each other. A retaining panel extends from the tray. The second connecting member is rotatably secured to the first connecting member. The retaining panel is located between the two clamping panels, for preventing the tray from moving in a direction substantially perpendicular to the two clamping panels.

18 Claims, 3 Drawing Sheets

HINGE STRUCTURE

BACKGROUND

1. Technical Field

The present disclosure relates to articulating devices, more particularly to a hinge structure of an electronic device.

2. Description of Related Art

Many electronic devices, such as notebook computers, utilize hinge structures. A hinge structure is located between a display and a main body of a notebook computer. To open or close the display relative to the main body, the display is rotatable about a shaft of the hinge structure. However, many such hinge structures are not firmly secured to the display and the main body. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
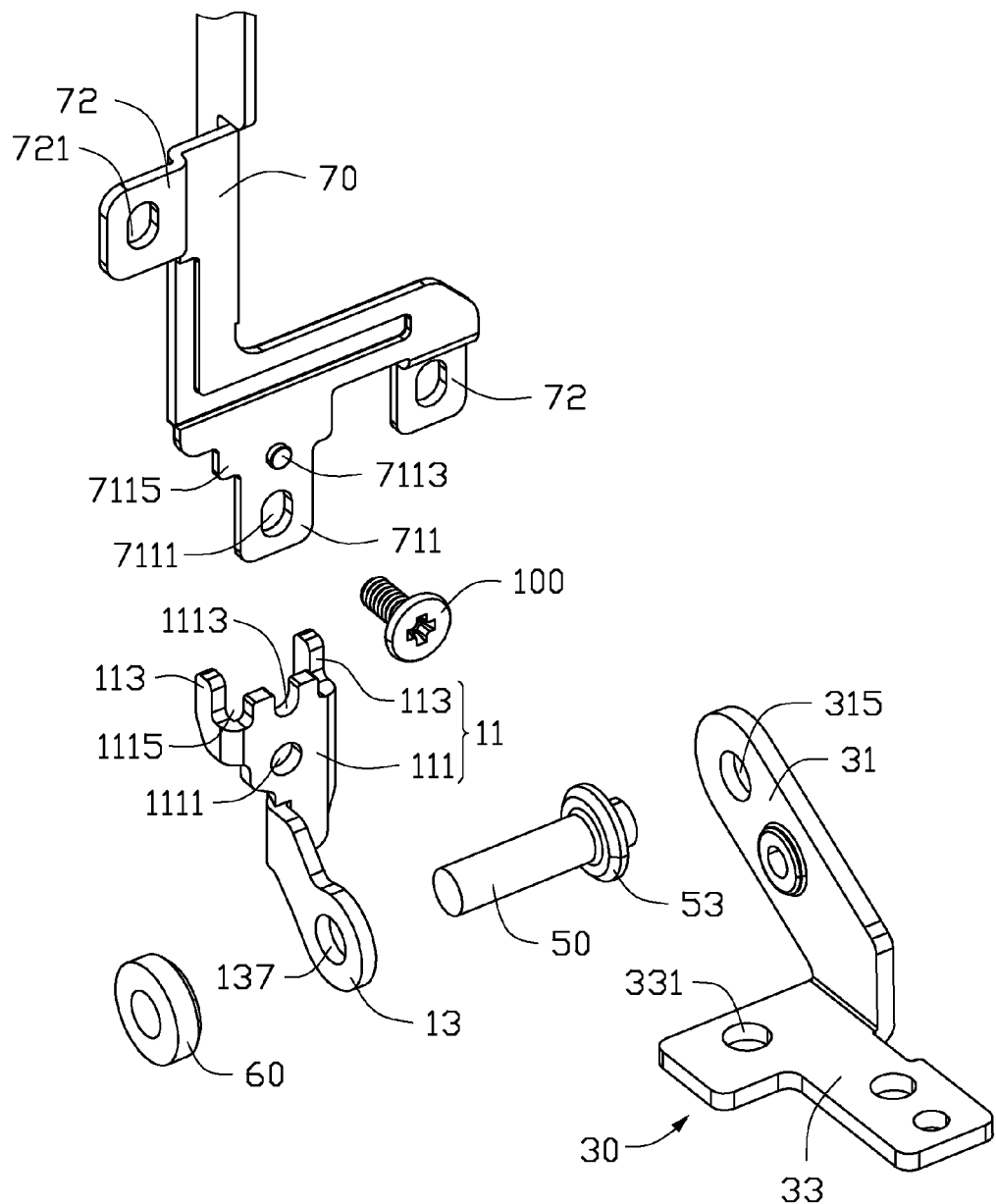
FIG. 1 is an exploded, isometric view of a hinge structure in accordance with an embodiment.
Figure 2:
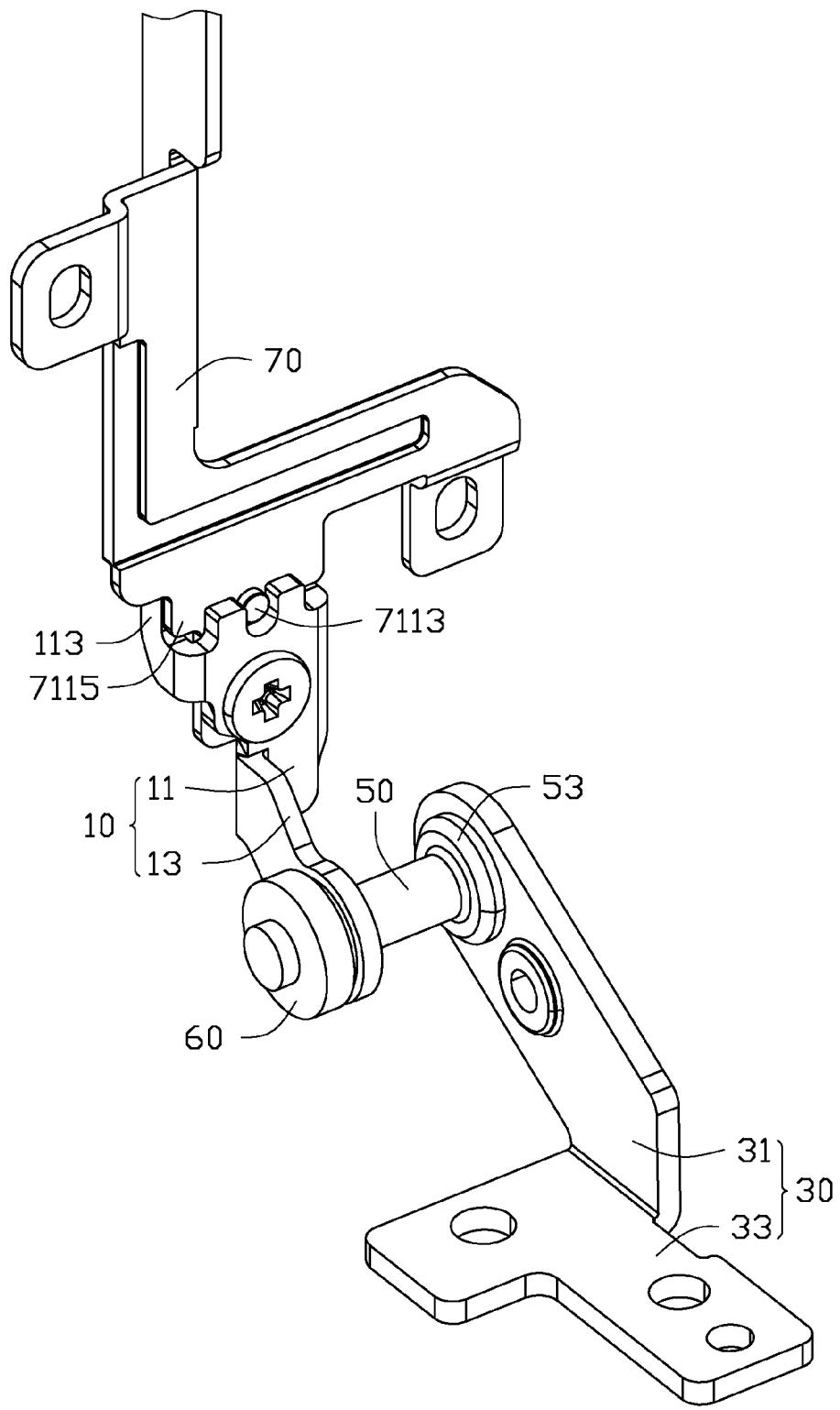
FIG. 2 is an assembled view of the hinge structure of FIG. 1.

FIGS. 1-2 illustrate a hinge structure in accordance with an embodiment. The hinge structure includes a first connecting member 10, a second connecting member 30, a shaft 50 connected to the first and second connecting members 10, 30, and a tray 70, engaged with the first connecting member 10. The hinge structure can connect a first component 90 to a second component 80 (see FIG. 3). In one embodiment, the first component 90 is a display of a notebook, and the second component 80 is a main body of the notebook.

The first connecting member 10 includes a first securing portion 11 and a first pivoting portion 13 connected to the first securing portion 11. In one embodiment, the first securing portion 11 is substantially perpendicular to the first pivoting portion 13. The first securing portion 11 includes a resisting portion 111 and two clamping panels 113 extending from opposite edges of the resisting portion 111. In one embodiment, each of the two clamping panels 113 is substantially perpendicular to the resisting portion 111. A securing hole 1111 and a cutout 1113, above the securing hole 1111, are defined in the resisting portion 111. In one embodiment, the cutout 1113 is substantially U-shaped, and the securing hole 1111 and the cutout 1113 are arranged in a straight line which is substantially parallel to the first pivoting portion 13. Two receiving slots 1115 are defined in the first securing portion 11. Each of the two receiving slots 1115 is located between the resisting portion 111 and each of the two clamping panels 113. A first pivoting hole 137 is defined in the first pivoting portion 13.

The second connecting member 30 includes a second pivoting portion 31 and a second securing portion 33 extending from the second pivoting portion 31. In one embodiment, the second pivoting portion 31 is slanted to the second securing portion 33. A second pivoting hole 315 is defined in the second pivoting portion 31. A plurality of mounting holes 331 are defined in the second securing portion 33. In one embodiment, the second securing portion 33 is substantially L-shaped.

A blocking portion 53 is located around the shaft 50. In one embodiment, the shaft 50 is columnar.

The tray 70 is used for securing the first component 90. A retaining panel 711 extends from a bottom edge of the tray 70, and a through hole 7111 is defined in the retaining panel 711. An engaging post 7113 protrudes from the retaining panel 711 above the through hole 7111. Two engaging shoulders 7115 are defined in the retaining panel 711 on opposite sides of the engaging post 7113. Two mounting panels 72, each with an engaging hole 721, extend from two adjacent edges of the tray 70.

Two first positioning posts 91 protrude from the first component 90, corresponding to the engaging holes 721. Two second positioning posts 81 protrude from the second component 80 and correspond to two mounting holes 331.

Figure 3:
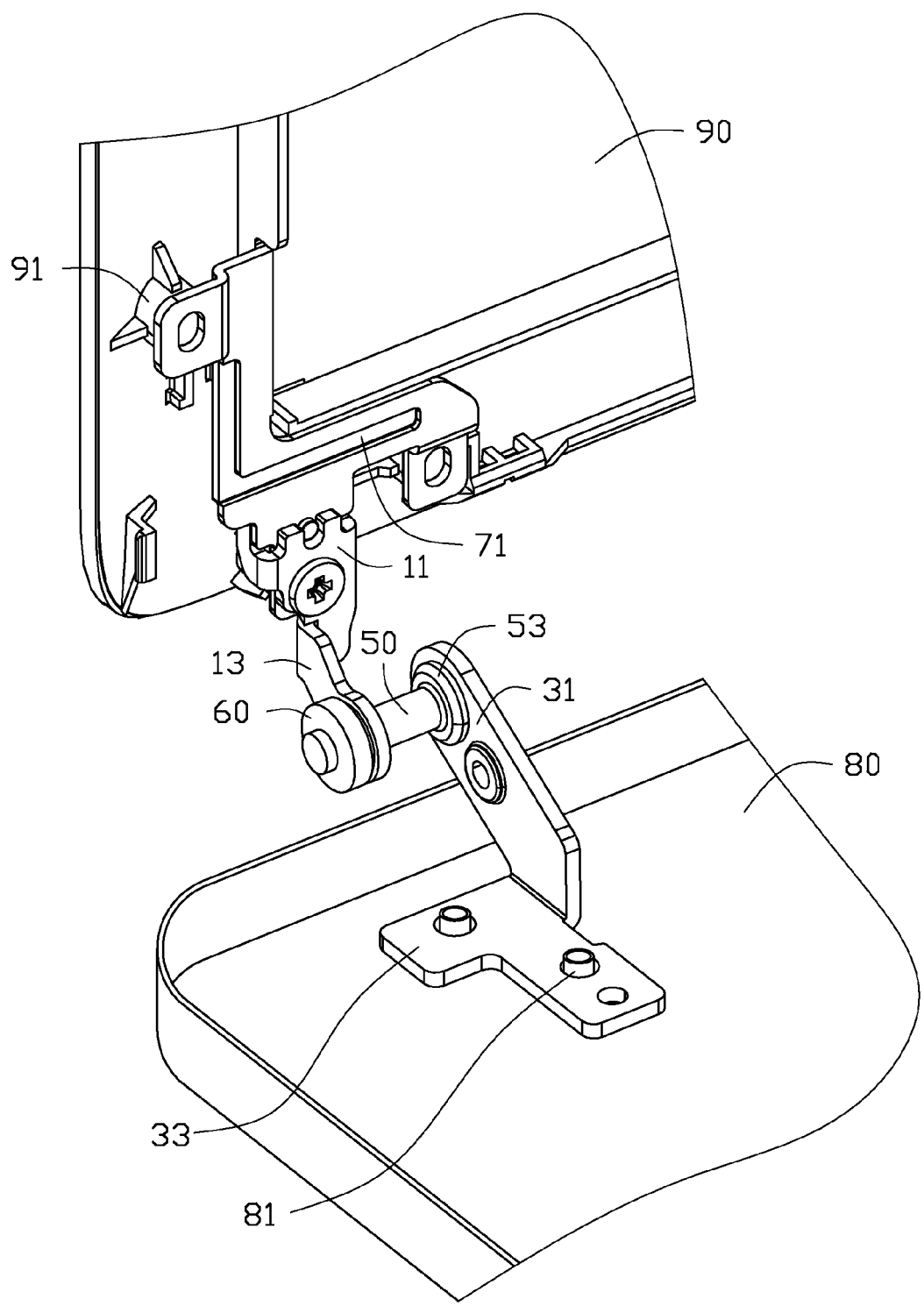
FIG. 3 is an assembled view of the hinge structure, and a first component and a second component in accordance with an embodiment.

FIGS. 2-3 illustrate an assembly of the hinge structure to the first component 90 and the second component 80 in accordance with an embodiment. In assembly, the first pivoting portion 13 extends toward the second pivoting portion 31, and the first pivoting hole 137 is aligned with the second pivoting hole 315. A first end of the shaft 50 extends through the second pivoting hole 315 to abut the blocking portion 53 against the second pivoting portion 31. A second end of the shaft 50 extends through the first pivoting hole 137, and a nut 60 is screwed onto the second end of the shaft 50. Therefore, the first and second connecting member 10, 30 are rotatably secured to the shaft 50.

The resisting portion 111 abuts the retaining panel 711. The two engaging shoulders 7115 are received in the two receiving slots 1115, and the engaging post 7113 is engaged in the cutout 1113. At this point, the two clamping panels 113 abut the back side of the retaining panel 711, to prevent the tray 70 from moving away from the resisting portion 111. The through hole 7111 is aligned with the securing hole 1111. A screw or other fixing member 100 is engaged in the through hole 7111 and the securing hole 1111, to secure the resisting portion 111 to the retaining panel 711.

The tray 70 abuts the first component 90. The two first positioning posts 91 are engaged with the two engaging holes 721, to secure the tray 70 to the first component 90. The two second positioning posts 81 are engaged in the two mounting holes 331, to secure the second securing portion 33 to the second component 80. Thereby, the first component 90 is connected to the second component 80 by the hinge structure, and the first component 90 is rotatable about the shaft 50 relative to the second component 80.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A hinge structure comprising:
a first connecting member comprising a resisting portion and two clamping panels substantially parallel to each other and connected to the resisting portion;
a tray; the tray attached to the first connecting member, and a retaining panel extending from the tray; and
a second connecting member; the second connecting member is rotatably secured to the first connecting member;
wherein the retaining panel abuts the resisting portion and is substantially perpendicular to each clamping panel; the retaining panel is located between the two clamping panels for preventing the tray from moving in a direction that is substantially perpendicular to the two clamping panels.

2. The hinge structure of claim 1, wherein two receiving slots are defined in the resisting portion, each of the two receiving slots is located between the resisting portion and each of the two clamping panels, and the retaining panel comprises two engaging shoulders engaged in the two receiving slots.

3. The hinge structure of claim 2, wherein an engaging post protrudes from the retaining panel; a cutout, located between the receiving slots, is defined in the resisting portion; and the engaging post is engaged in the cutout.

4. The hinge structure of claim 2, wherein a securing hole is defined in the resisting portion; a through hole is defined in the retaining panel; and a fixing member is engaged in the securing hole and the through hole, to prevent the tray from moving in a direction substantially parallel to the two clamping panels.

5. The hinge structure of claim 2, further comprising a shaft, wherein the first connecting member further comprises a first pivoting portion connected to the resisting portion, the second connecting member comprises a second pivoting portion, and the shaft is rotatably engaged with the first pivoting portion and the second pivoting portion.

6. The hinge structure of claim 5, wherein the first pivoting portion is engaged with a first end of the shaft, and the second pivoting portion is engaged with a second end of the shaft.

7. The hinge structure of claim 5, wherein the shaft comprises a blocking portion, and the blocking portion abuts the second pivoting portion.

8. The hinge structure of claim 5, wherein the second connecting member further comprises a securing portion, and the securing portion is connected to the second pivoting portion.

9. The hinge structure of claim 8, wherein the tray further comprising two mounting panels, and the two mounting panels extend from two adjacent edges of the tray.

10. A hinge structure comprising:
a first connecting member comprising a resisting portion and two clamping panels substantially parallel to each other and connected to the resisting portion; and two receiving slots defined in the resisting portion, and each of the two receiving slots located between the resisting portion and each of the two clamping panels;
a tray; a retaining panel extending from the tray; and the retaining panel comprising two engaging shoulders; the two engaging shoulders being engaged in the two receiving slots, and each engaging shoulder abutting the resisting portion and each clamping panel; and
a second connecting member; the second connecting member rotatably secured to the first connecting member;
a fixing member engaged with the tray and the first connecting member, for preventing the tray from moving in a first direction substantially parallel to the two clamping panels;
wherein the retaining panel is located between the two clamping panels, for preventing the tray from moving in a second direction substantially perpendicular to the two clamping panels.

11. The hinge structure of claim 10, wherein an engaging post protrudes from the retaining panel, a cutout, located between the receiving slots, is defined in the resisting portion; and the engaging post is engaged in the cutout.

12. The hinge structure of claim 10, further comprising a shaft, wherein the first connecting member further comprises a first pivoting portion connected to the resisting portion, the second connecting member comprises a second pivoting portion, and the shaft is rotatably engaged with the first pivoting portion and the second pivoting portion.

13. The hinge structure of claim 12, wherein the first pivoting portion is engaged with a first end of the shaft, and the second pivoting portion is engaged with a second end of the shaft.

14. The hinge structure of claim 12, wherein the shaft comprises a blocking portion, and the blocking portion abuts the second pivoting portion.

15. The hinge structure of claim 12, wherein the first pivoting portion is substantially parallel to the second pivoting portion.

16. The hinge structure of claim 12, wherein the second connecting member further comprises a securing portion, and the securing portion is connected to the second pivoting portion.

17. The hinge structure of claim 16, wherein the tray further comprising two mounting panels, and the two mounting panels extend from two adjacent edges of the tray.

18. The hinge structure of claim 16, wherein the second pivoting portion is slanted relative to the securing portion.

* * * * *